(No Model.) 2 Sheets—Sheet 1.

J. PRICE.
SEED SOWER.

No. 317,013. Patented May 5, 1885.

Witnesses,
Geo. H. Strong.
G. D. Rouse

Inventor
Jacob Price
By Dewey & Co.
Attorneys (No Model.) 2 Sheets—Sheet 2.

J. PRICE.
SEED SOWER.

No. 317,013. Patented May 5, 1885.

Witnesses,
Geo. H. Strong.
J. H. Rouse.

Inventor,
Jacob Price
By Dewey & Co.
Attorneys

UNITED STATES PATENT OFFICE.

JACOB PRICE, OF SAN LEANDRO, CALIFORNIA.

SEED-SOWER.

SPECIFICATION forming part of Letters Patent No. 317,013, dated May 5, 1885.

Application filed May 1, 1884. (No model.)

*To all whom it may concern:*

Be it known that I, JACOB PRICE, of San Leandro, county of Alameda, and State of California, have invented an Improvement in Seed-Sowers; and I hereby declare the following to be a full, clear, and exact description thereof.

My invention relates to the class of broadcast seeding-machines in which a rotating distributer receives its grain from a hopper and discharges it over the ground.

My invention consists in the construction and arrangement, with relation to each other, of the hopper, the rotating distributer, and the elevator, hereinafter described.

It also consists in details of construction relating to the regulation of the feed, to the base-frame of the machine and the manner of its attachment to the wagon, and to the gearing devices by which power is transmitted from the wagon to the elevator and distributer, all of which I shall hereinafter fully describe.

The object of my invention is to provide an easily-handled seeder, and one capable of doing good and effective work, both with regard to the extent of the work in a given time and to its quality with respect to an even distribution.

Figure 1:
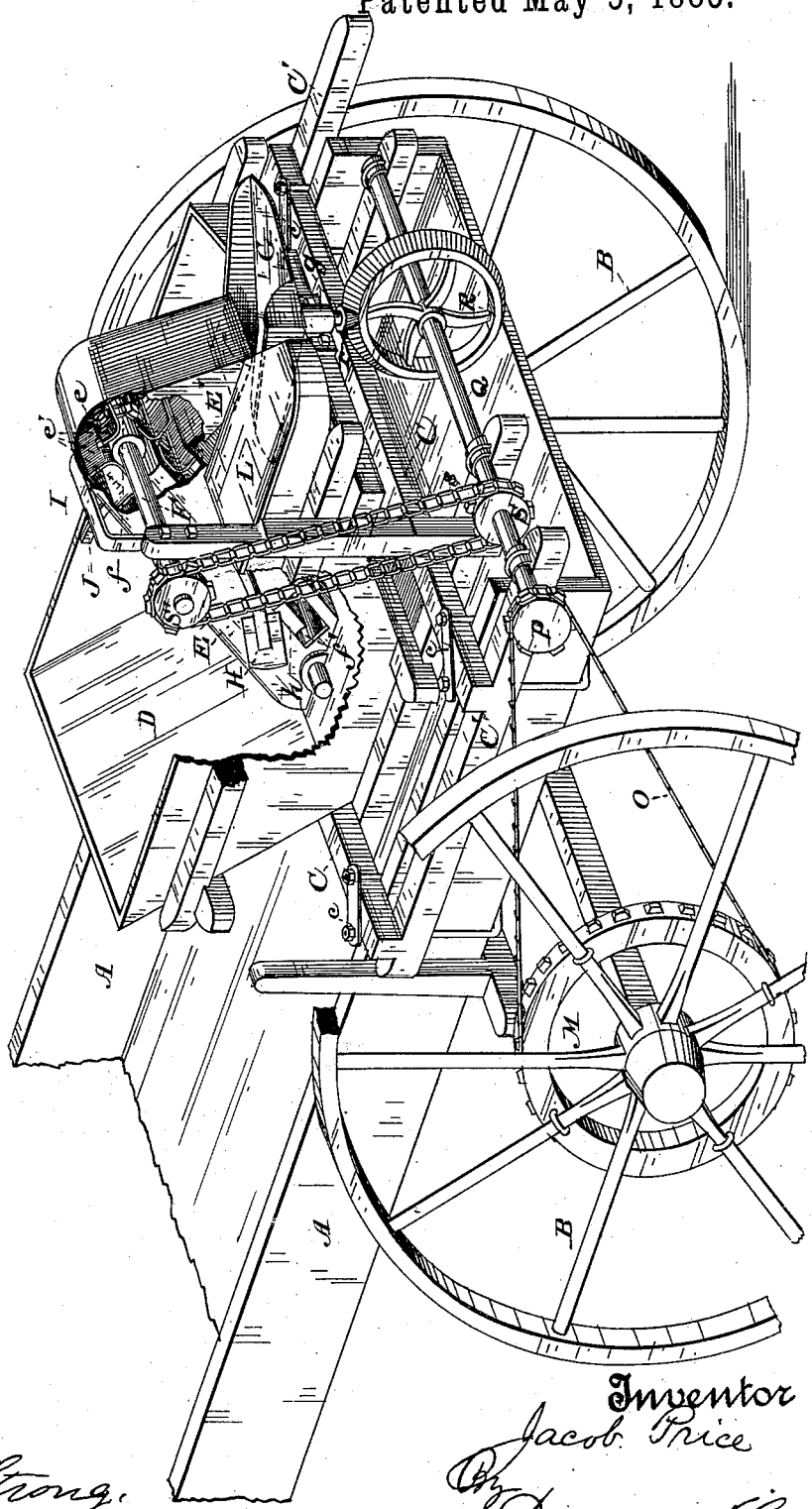
Figure 3:
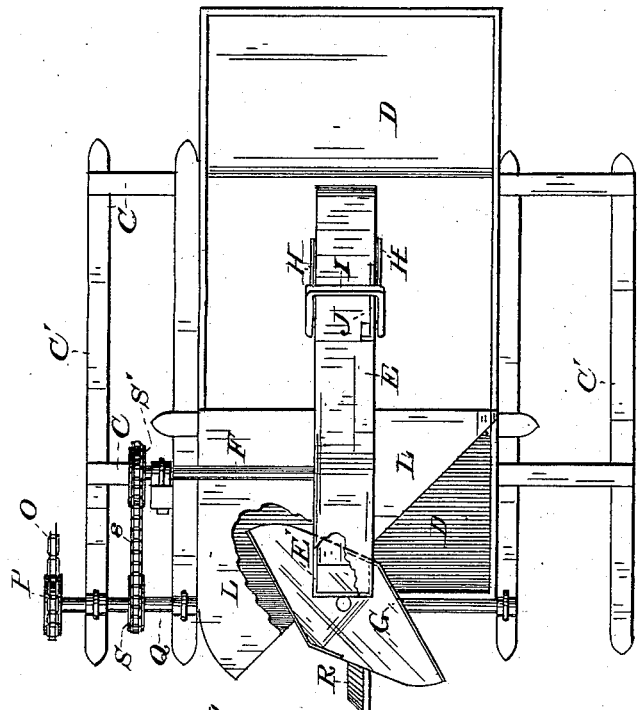
Figure 2:
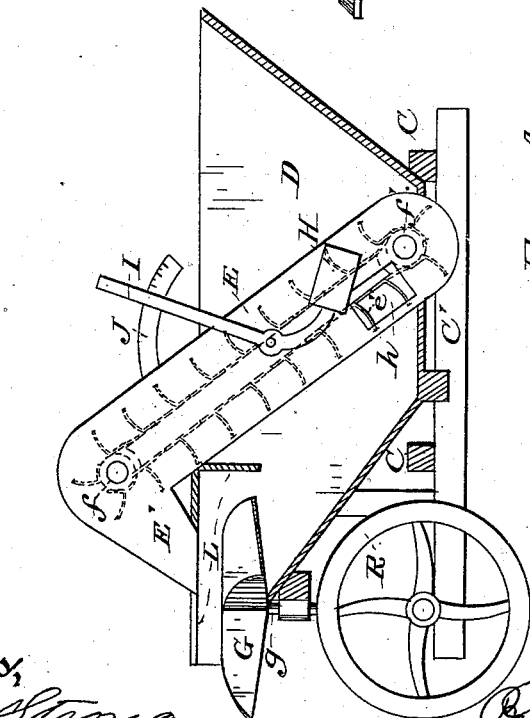
Figure 4:
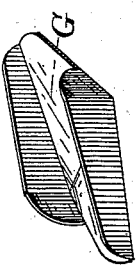

Referring to the accompanying drawings, Figure 1 is a perspective view of my seed-sower, showing it attached to a wagon, various portions being cut away in order to exhibit the interior mechanism of the machine. Fig. 2 is a longitudinal vertical section and side elevation of the elevator. Fig. 3 is a plan. Fig. 4 is a view of the seed-distributer.

A are the sills or sides of a wagon, of which B are the wheels.

C are the transverse bars or sills, and C' the longitudinal bars forming the base-frame, upon which the hopper D and other parts of the machine are supported. The cross-bars C are clipped firmly to the sills of the wagon by suitable clips, c; or they may be otherwise firmly secured.

In the hopper D is an elevator, E, consisting of a suitable exterior box or casing, e, and an interior traveling endless chain furnished with buckets e', which move against the inner surfaces of the walls of the casing, Fig. 2. This casing or elevator extends upwardly from the bottom or a little below the bottom of the hopper to a point above its top, and is provided in its bottom with a chain-receiving pulley, f', and in its top with a chain-driving pulley, f, which is on a shaft, F, to which the power is applied.

Connected with the upper end of the elevator-casing is a downwardly-extending spout, E', adapted to discharge directly upon the center of the distributer G. This distributer is located in the rear top center of the hopper upon a vertical spindle, g, and consists of a plate having upturned side flanges, and bent to form an open-top receptacle or funnel having oppositely-extending hollow arms in a horizontal plane, forming passages through which the grain is discharged by centrifugal force as the distributer revolves. The shape of the distributer is shown in Fig. 4.

In the sides of the elevator-casing, near its bottom, are formed valves consisting of apertures h, the receiving capacity of which is regulated by the plates or gates H upon the ends of a handle bail or lever, I, pivoted to the sides of the elevator-casing. The movement of the bail-lever carries the gates over the apertures or uncovers them, or partially closes or opens them, according to the amount of grain to be admitted. This movement of the lever may be accurately determined by means of a graduated arc or scale, J, extending from one side of the elevator, Fig. 2. The side of the bail plays over its face, whereby the amount of movement of the bail is indicated.

Across the rear top of the hopper is formed a covered chute or passage, L, having its rear end open and beveled from one side, as shown, Figs. 2, 3. The lower wall of this chute is inclined downwardly, being, in fact, a continuation of the rear wall of the hopper, and the forward end of the chute opens directly into the hopper, whereby said chute may be regarded as a covered rear portion of the hopper, Fig. 2. The arms of the distributer play into the rear end of the chute as they revolve.

Motion is imparted to the various parts of the machine as follows: Upon one of the wheels of the wagon is a chain-pulley, M, from which an endless chain, O, extends to a small pulley, P, on a shaft, Q, mounted on the rear of the longitudinal sills of the base-frame. On the other end of shaft Q is a beveled gear, R, meshing with a pinion, r, on the vertical spindle g, upon which the distributer is mounted, whereby revolution is imparted to said distributer. Upon the shaft Q is a chain-pulley, S, from which a chain, s, extends to a chain-pulley, S', on the shaft F, by which power is transmitted to the elevator. It will be observed that by this arrangement of power devices the elevator is driven in such direction that the top or upper series of buckets descend while the lower or under series ascend, and that the distributer revolves in a direction by which its arms enter the chute L at the rear of the hopper.

The operation of the machine is as follows: The grain is emptied into the hopper, and the valves of the elevator are opened to the desired extent. The grain enters the elevator, and by it is carried up the lower wall of the elevator-casing and discharged through spout E' onto the center of the distributer, by which it is cast or sown over the ground.

The first advantage of the machine lies in the relative positions of the hopper and distributer. The former should be set low, to facilitate the emptying of the grain therein, and the latter should be sufficiently elevated to insure a wide throw or discharge. Ordinarily these two requisites conflict, for the grain must pass from the hopper to the distributer, and if gravitation alone effects this it is obvious that if the hopper be placed low the distributer cannot be high, and if the distributer is high the hopper will be too high for convenience. I obtain the required results by the employment of a suitable intermediate device by which the grain can be elevated from the low hopper to the high distributer. The grain-sack can readily be tilted over the edge of the hopper and its contents discharged into it, and no lifting of the sack is necessary.

The next advantage lies in the location of the distributer with regard to the parts surrounding it. When a rotary distributer is used whose operation takes place in a clear space, and which discharges its grain throughout the whole circle of three hundred and sixty degrees, it is obvious that the grain will be sown twice as thick in the line of travel of the machine, because all that is thrown directly ahead will fall on the same strip of ground as that which is thrown directly behind. In my machine, however, the grain is discharged upon the ground through but half the circle—the back half—because that which is discharged during the revolution of the distributer through the front half of its course falls back into the hopper again. This is the object of the rearwardly-extending chute L—namely, it catches and guides the grain back and down into the hopper. In this manner I obtain a very even sowing throughout the limits of its operation.

The next advantage of the machine is in the fact that the passage of the grain from the hopper to the distributer being through a mechanism which, as well as the distributer itself, derives its operation from the travel or progress of the wagon, it is obvious that the speed of the wagon directly effects the amount of discharge. Therefore, when the horses walk fast and cover more ground in a given time, the amount of grain fed to the distributer and discharged by it is correspondingly increased, and a reverse result is obtained when the horses walk slow. This result also gives an even distribution, which of course could not be had if the discharge were at a uniform rate, whether the horses moved rapidly or slowly, because in the former case, more ground being covered in the given time, the earth would be sown much thinner than in the latter case.

The last advantage which I shall call attention to is that which results from clipping the machine solidly to the wagon-bed. The sills of the base-frame enable this to be done. The usual practice is to stand them on legs upon the wagon, and it is difficult to steady them; but when clipped solidly, as I show, the machine is as firm and steady as desirable. The distributer rotating in a horizontal plane and being subjected to a constant feed throws the grain equally in all directions, though but half of it is allowed to fall.

Having thus described my invention, what I claim as new, and desire to secure by Letters Patent, is—

1. In a seed-sower, the hopper D, the rotating distributer G at its rear top, and the elevator E in the hopper, having valves at its lower end to admit the grain, and a discharge-spout, E', at its upper end to discharge the grain upon the rotating distributer, substantially as described.

2. In a seed-sower, the hopper D and distributer G, in combination with the elevator E in the hopper, said elevator having valves or apertures h in its sides near its lower end, a means for regulating the capacity of said valves, and the spout E' at the upper end of the elevator, adapted to discharge the grain upon the distributer.

3. In a seed-sower, the elevating device E, by which the grain is taken from the hopper and elevated to and discharged upon the distributer, said elevator having the valves or apertures h in its sides near its lower end, and the pivoted lever or bail I, having the gates H on its ends, adapted to regulate the capacity of the apertures, substantially as herein described.

4. In a seed-sower, a hopper and a rotating distributer adapted to receive grain from the hopper, and to discharge its grain during one-half its revolution back again into the hopper, substantially as herein described.

5. In a seed-sower, a hopper, a rotating distributer located at its rear top edge, a mechanism for elevating the grain from the hopper and discharging it upon the center of the distributer, and a suitable passage or chute connected with the hopper, whereby the grain discharged from the distributer during one-half its revolution is reconveyed into the hopper, substantially as described.

6. In a seed-sower, the combination of hopper D, the rotating distributer G at its rear top center, the elevator E, spout E', and the chute or passage L, communicating with the hopper, and adapted to receive the grain discharged from the distributer during the forward half of its revolution and reconvey it to the hopper, substantially as described.

7. A seed-sower consisting of the hopper, the distributer, and the elevator, arranged with relation to each other as described, and mounted on a wheeled frame or wagon, in combination with the mechanism by which the elevator is operated and the distributer rotated, consisting of the chain-pulley M on the wheel of the wagon, the chain O, the shaft Q, carrying chain-pulleys P S and gear R, the spindle $g$, upon which the distributer is mounted, and having a pinion, $r$, the chain $s$, shaft F, having chain-pulleys S', and the chain-pulley $f'$ at the bottom of the elevator, all arranged and operating substantially as and for the purpose herein described.

In witness whereof I have hereunto set my hand.

JACOB PRICE.

Witnesses:
S. H. NOURSE,
C. D. COLE.